United States Patent [19]

Grimm et al.

[11] Patent Number: 4,671,565
[45] Date of Patent: Jun. 9, 1987

[54] CABLE GUIDE FOR SLIDING ROOFS OF MOTOR VEHICLES

[75] Inventors: Rainer Grimm, Wetzlar; Horst Böhm, Frankfurt am Main; Peter Schäfer, Maintal, all of Fed. Rep. of Germany

[73] Assignee: Rockwell-Golde G.m.b.H, United Kingdom

[21] Appl. No.: 501,960

[22] Filed: Jun. 7, 1983

[30] Foreign Application Priority Data

Jul. 6, 1982 [DE] Fed. Rep. of Germany ....... 3221487

[51] Int. Cl.$^4$ .......................... B60J 7/043; B60J 7/053; B60J 7/057
[52] U.S. Cl. .................................. 296/216; 296/222; 296/223; 296/213; 49/362
[58] Field of Search ........ 296/213, 216, 217, 220–223; 280/804; 10/96 R, 101; 49/360, 362

[56] References Cited

U.S. PATENT DOCUMENTS

| 3,075,807 | 1/1963 | Werner | 296/216 |
| 3,290,087 | 12/1966 | Werner | 296/222 |
| 3,830,518 | 8/1974 | Silber | 280/804 |
| 3,964,784 | 6/1976 | Precter et al. | 296/220 |
| 4,085,965 | 4/1978 | Schlapp | 296/213 |
| 4,272,123 | 6/1981 | Mori | 296/222 |
| 4,362,321 | 12/1982 | Volk | 280/804 |
| 4,362,332 | 12/1982 | Garnham | 296/217 |

FOREIGN PATENT DOCUMENTS 2836801 3/1980 Fed. Rep. of Germany ...... 296/223

Primary Examiner—Robert B. Reeves
Assistant Examiner—Dennis H. Pedder

[57] ABSTRACT

A cable guide for automobile sliding roofs having two lateral guide components (9), which together displaceably guide the guide shoes (7,8) of a sliding panel, and one forward guide component (10), adjoining the two lateral guide components. To achieve a simplified construction which can be manufactured and installed at low cost while simultaneously avoiding butt joints in the region of the cable guide channels which are (19,10) continuous through all three guide components, all three guide components (9,10) have an identical cross-sectional shape and are formed from a single-piece guide frame (11).

17 Claims, 8 Drawing Figures 4,671,565

CABLE GUIDE FOR SLIDING ROOFS OF MOTOR VEHICLES

BACKGROUND OF THE INVENTION

1. Field of the Invention

This invention relates to a cable guide for automobile sliding roofs. Specifically, it relates to such guides consisting of two lateral guide components, oriented parallel to each other, which together guide the guide shoes of a sliding roof panel. A forward guide component, adjoining the two lateral guide components via rounded corners, has the cable drive apparatus connected to it. All three guide components have two adjacently situated guide channels to guide the cables, the spacing between channels being of equal size in all three guide components.

2. Description of the Prior Art

The term "sliding roof" is intended to include for the purposes of this description not only those constructions in which the sliding panel after its rear edge has been lowered, can be slid beneath the rear, fixed roof surface to expose the roof opening, but also "sliding-lifting roof" constructions, in which the sliding panel in addition, starting from its closed position, can be pivoted about a pivot axis located in the vicinity of its forward edge to raise it above the fixed roof surface.

In all known sliding roof constructions, the cable guide is constructed of a plurality of parts. This which not only makes manufacture and assembly difficult, but also results in butt joints between the individual parts, at which a step-shaped offset can occur, with the result that during the displacement of the cables through all the parts for the purpose of actuating the sliding panel, noise and difficulties in running can occur. Thus, one known cable guide (DE-OS 28 36 801) of the initially designated category is composed of three guide components, namely two like lateral guide components and one forward guide component, connecting the two lateral guide components together and itself of multipart construction. The two lateral guide components as is usual in all known sliding roof constructions, are differently constructed from the forward guide component. In the assembling of the known cable guide, the free ends of the cables situated in the lateral guide components are threaded into the forward guide component, whereupon a lining frame is pushed between the lateral guide components. This pre-assembled structure is then installed in the vehicle, i.e. the forward guide component is at first only indirectly connected with the two lateral guide components. The relative position of the three guide components is not fixed until installation in the automobile.

The two lateral guide components may also be pre-assembled with the forward guide component according to the state of the art (DE-OS 29 14 855) to form one installation unit, in which again the lateral guide components are of different construction from the forward guide component. But here again the aforementioned disadvantageous butt joints occur in the region of the cable guide channels.

SUMMARY OF THE INVENTION

The task underlying the present invention is to provide a cable guide of simplified construction, which can be manufactured and installed at comparatively low cost and which possesses, in the region of the cable guide channels, no annoying butt joints.

The stated task is achieved according to this invention, starting from the initially mentioned category, in that all three guide components have identical profiling in respect to form and dimensions and are formed by a one single-piece U-shaped guide frame.

As a departure from the examples presented by the state of the art, the cable guide of this invention possesses, both at its forward guide part and also at the two lateral guide parts, an identical profiling and is shaped from a single profile length to a one-piece, rearwardly open guide frame. Such a frame structure does not require any preassembly of its guide components and also possesses no butt joints in the region of the cable guide channels, because these channels extend continuously and uninterruptedly to form the three guide components. The invention starts from the consideration, which could not be deduced from the state of the art, that a profiling may be used for the forward guide component which is the same as that of the lateral guide components. The single-piece guide frame of this invention permits considerable preassembling of the functional parts of the sliding roof associated with it, with the result that the manufacture and assembly of an installation unit composed of cable guide and functional parts is very much simplified.

In pursuance of the concept of this invention it is provided that the guide frame may consist of a metal profile or extrusion, which is bent at the two corners. The bending of metal profiles using the corner radii common in sliding roof construction can be readily carried out in the extrusion bending method without disturbing deformations of the profile. For this it is of particular advantage for the metal profile to be an extruded profile formed from a malleable aluminium alloy. The metal profile may, however, also be formed from sheet metal, in particular may be rolled from steel sheet. Such a metal profile also can be bent to the desired radii without disturbing distortions in the corner region.

The construction of the guide frame is not, however, restricted to metal materials. Thus the guide frame may also consist of a profile formed of a thermoplastics material, which is bent at the two corners. A suitable material for this, for example, is polyamide 6.6. If the plastics profile is heated in the corner region before bending, then a plastic deformation of the plastics material takes place during bending, without disturbing deformations occurring in the corner region of the profile. In order to keep any deformations quite small, bending cores can, of course, be inserted into the profile for the bending operation.

According to a further feature of the invention, the guide frame possesses essentially an upwardly open U-shaped cross-section, in each of the thickened lateral walls of which a back-cut, upper cable guide channel and a lower guide channel for the guide shoes are disposed in opposite handed arrangement one above another and open towards the profile cavity.

In this manner a guide frame is obtained, the cross-sectional profile of which contains not only the necessary cable guide channels opposite to each other, but also additional guide channels for the guide shoes, so that a low-clearance guidance of the sliding panel by means of the guide shoes acting thereon is attained.

For fixing the cable guide to the sliding roof frame which usually surrounds the roof opening, preferably to the upwardly projecting rib which bounds the water channel in the sliding roof frame, it is advantageous if an outwardly projecting fixing flange is integrally formed on the guide frame adjoining the outer side wall of its cross-section.

An additional guidance and security against lifting of the guide shoes from the guide frame is achieved if an inwardly projecting guide flange for the guide shoes is integrally formed on the guide frame, adjoining the inner side wall of its cross-section at the top.

For the attachment of further, adjacent components to the guide frame, it is advantageous if further, inwardly projecting flanges for guiding a panel lining and fixing a roof lining are integrally formed on the frame at the inner side wall of its cross-section.

In one especially advantageous embodiment of the invention, an outwardly projecting water channel, furnished with a fixing flange, is integrally formed on the guide frame adjoining the outer side wall of its cross-section at the bottom. This construction makes possible the manufacture of a guide frame which already contains in the form of the water channel a substantial part of the hitherto usual sliding roof frame. The conventional sliding roof frame can, therefore, basically be dispensed with in this embodiment. It is only necessary to insure that a roof flange opposite to the fixing flange is provided, in order that the guide frame can be fixed directly thereto.

For simplifying the bending operation and avoiding material distortions, it is advantageous if the water channel of the guide frame is cut away in the region of the corners to facilitate bending, and its cut-outs be closed after bending by attaching plastic inserts.

The guide frame may be stiffened by a transverse connector, oriented parallel to the forward guide component and connecting together the free ends of the lateral guide components. By means of the transverse connector, a very stable installation unit is attained.

For the guiding of the forward guide shoes, the lateral guide components of the guide frame each displaceably seat slide projections of the forward guide shoes in the two guide shoe guide channels and additionally displaceably guide, with their guide flange, hook-like projections of the guide shoes. In this manner a sliding guidance of the forward guide shoes possessing little play and preventing lifting from the guide frame is obtained.

For guiding of the rear guide shoes the lateral guide components of the guide frame each displaceably seat slide projections of the rear guide shoes in the two cable guide channels and additionally displaceably guide, with their guide flange, hook-like projections of the guide shoes. By these means, a guiding of the rear guide shoes in the guide frame with low clearance and secured against lifting is obtained. The attachment of the cables for sliding actuation of the rear guide shoes is effected for each at one of the slide projections inside the relevant cable guide channel.

The particular construction of the guide frame opens up the advantageous possibility that the profile cavity of the guide frame may also be provided for at least partial seating of the functional components connected with the sliding lid and possibly with a wind deflector. In this manner a space-saving and inconspicuous housing of these functional components on the guide frame is achieved. All the functional components are then situated outside the water channel and moreover do not project into the roof opening.

In a further embodiment of the cable guide it is provided that, above the guide frame, a water guide plate is connected with the rear guide shoes and designed to penetrate beneath the rear edge gap between the sliding panel and the automobile roof. The discharge ends of which terminate above the water channel and which is displaceably guided at both sides in a cable guide channel. If the water guide plate is appropriately dimensioned, the water collecting dish of the sliding roof frame of large area, which is usual in the previous sliding roof constructions, can be dispensed with. If a guide frame with an integrated water channel is used, then the rearward water discharges may be directly connected to this water channel.

In pursuance of the concept of this invention, there is disposed in the forward guide component of the guide frame an opening passing through the web wall situated between the thickened side walls and extending as far as the profile cavity, for the passage of the drive shaft of the toothed pinion engaging the two cables. Further measures do not need to be taken in the region of the forward guide component for the force transmission to the two cables, because the dimensions of the toothed pinion and the dimensions of the guide frame profile can be adapted to one another that the toothed pinion comes into engagement with the two cables situated in the mutually facing guide channels. Since, in the region of the forward guide component, no guide shoes are guided on the guide frame profile, the profile cavity can be closed by a cover, by which the toothed pinion is also covered.

The guide frame profile is advantageously so constructed that the cable guide channels, as seen in cross-section, are of such a form that only partial zones of the channel wall guide the cables. This results in very low-friction guidance of the cables inside their guide channels.

Further details of the invention are explained in greater detail below with reference to the drawings which illustrate examples of embodiment thereof.

DETAILED DESCRIPTION OF THE PREFERRED EMBODIMENTS

Figure 2:
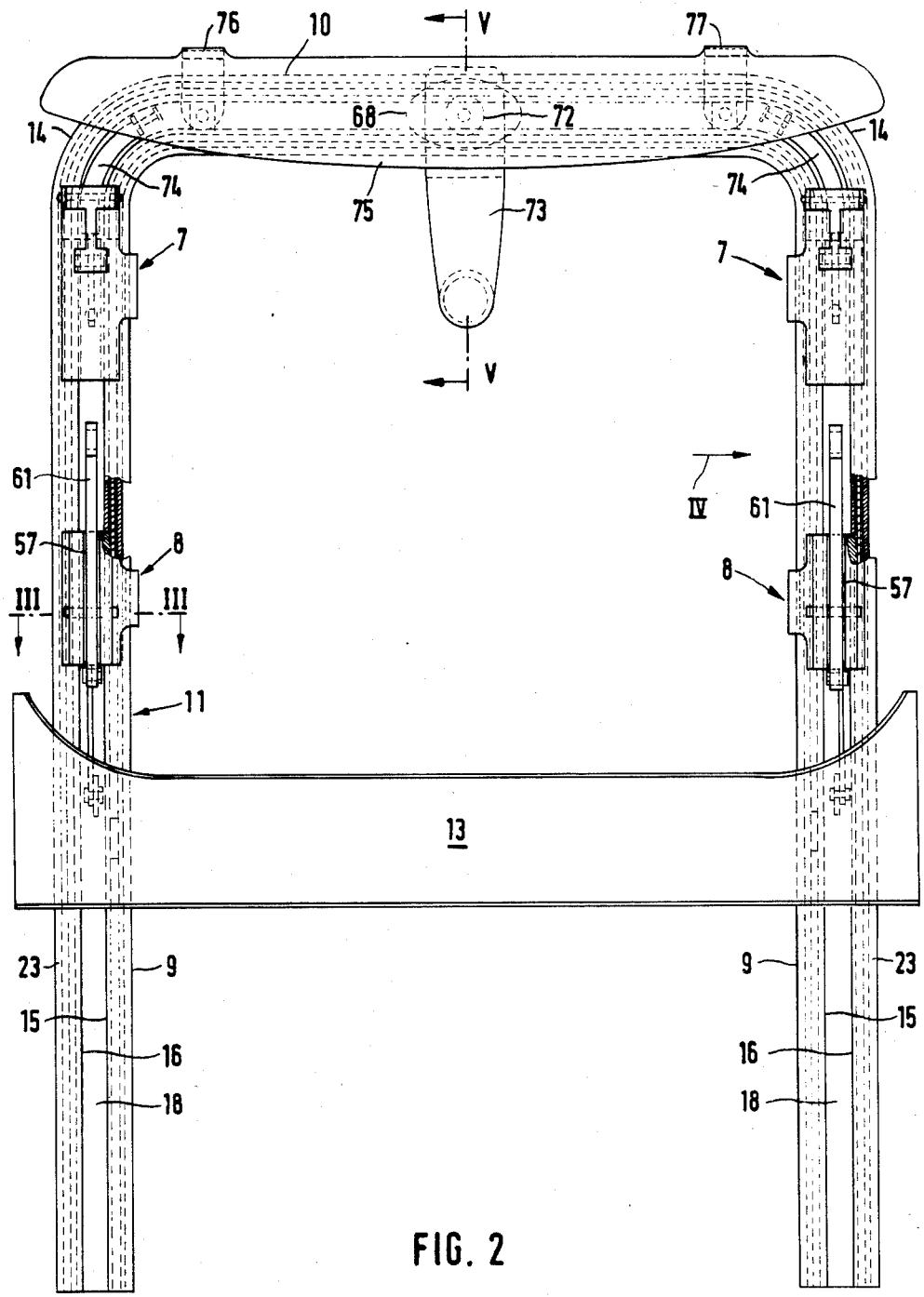
FIG. 2 is a plan view of a first embodiment of a guide frame according to the invention including the functional components of the sliding roof construction fitted to the guide frame.
Figure 4:
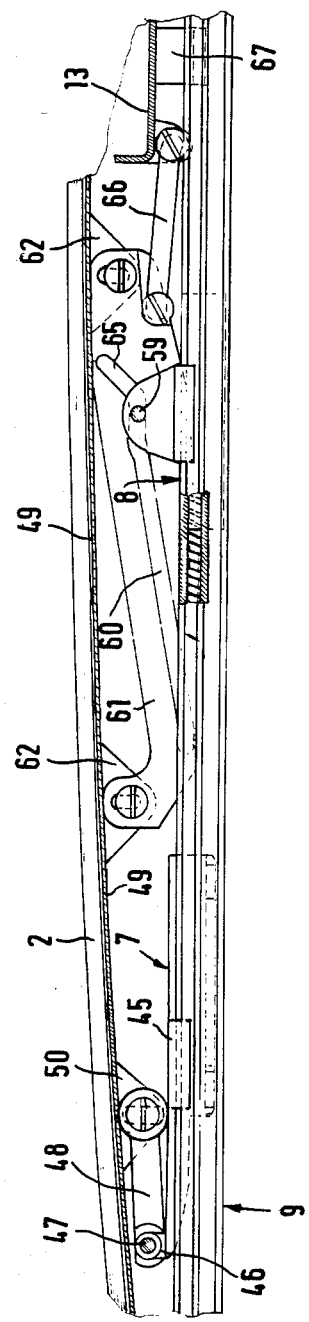
FIG. 4 is a partial side view of the guide frame and the functional components connected therewith viewed in the direction of arrow IV in FIG. 2.
Figure 5:
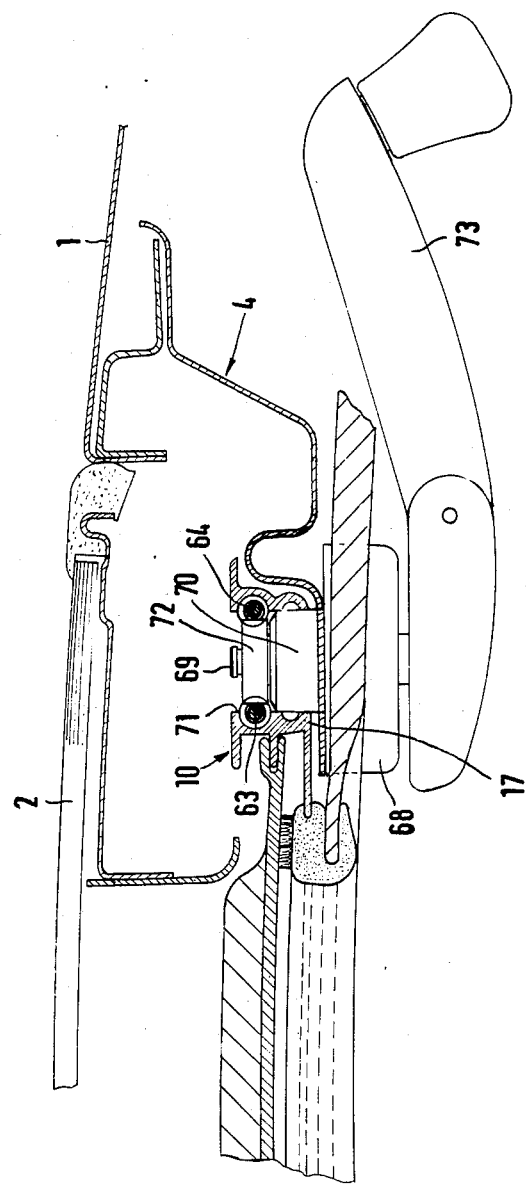
FIG. 5 is a partial sectional view through the drive apparatus taken along the line V—V in FIG. 2, with the handle displaced approximately 180°.
Figure 6:
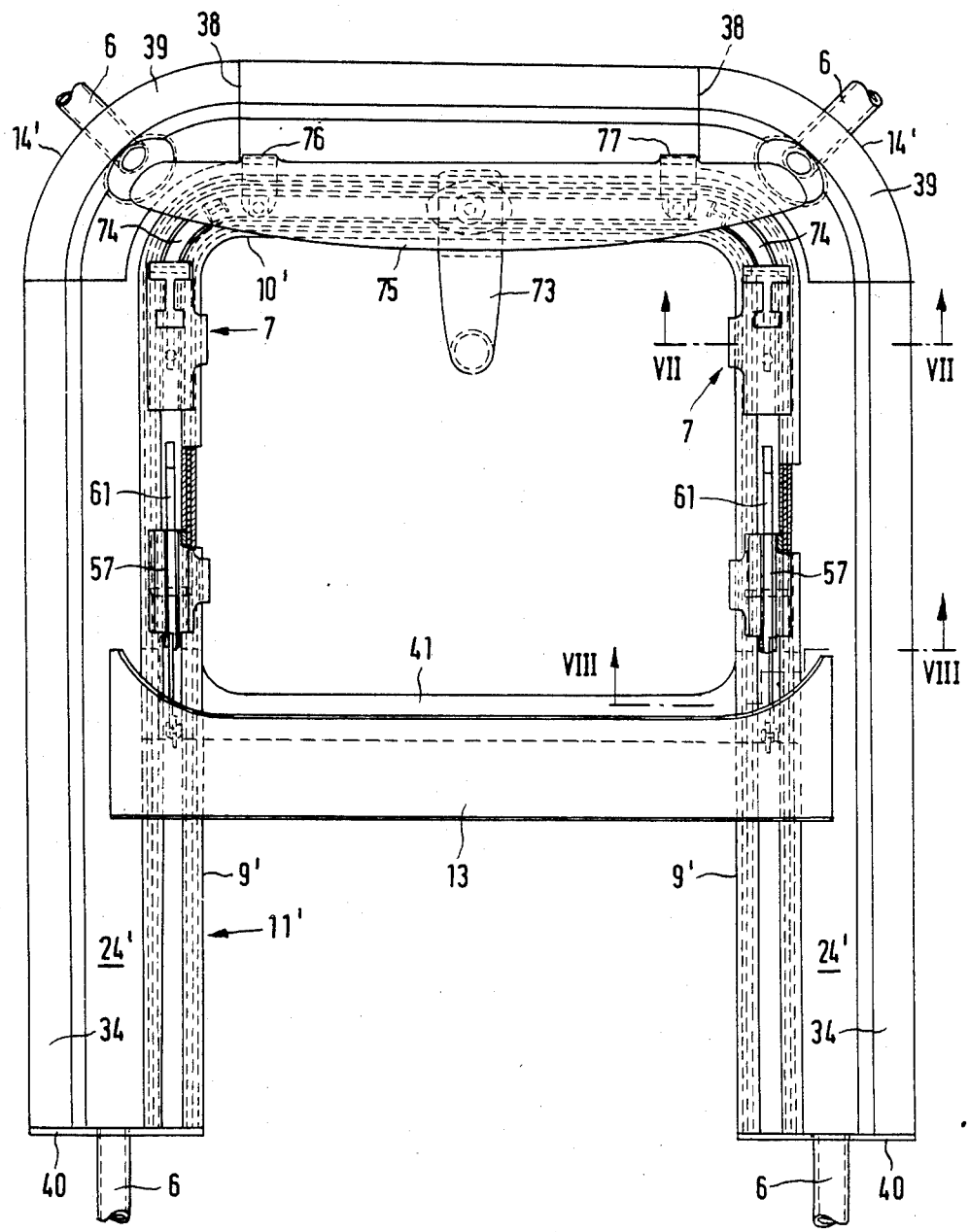
FIG. 6 is a plan view of a second embodiment of a guide frame according to the invention and of the functional components connected therewith.

In FIGS. 2 and 6 only the guide frame and the functional components immediately connected therewith are illustrated, while FIGS. 3 to 5, 7 and 8 also show the components adjacent to the guide frame, with which the guide frame and its functional components mounted thereon are in direct connection.

Figure 1:
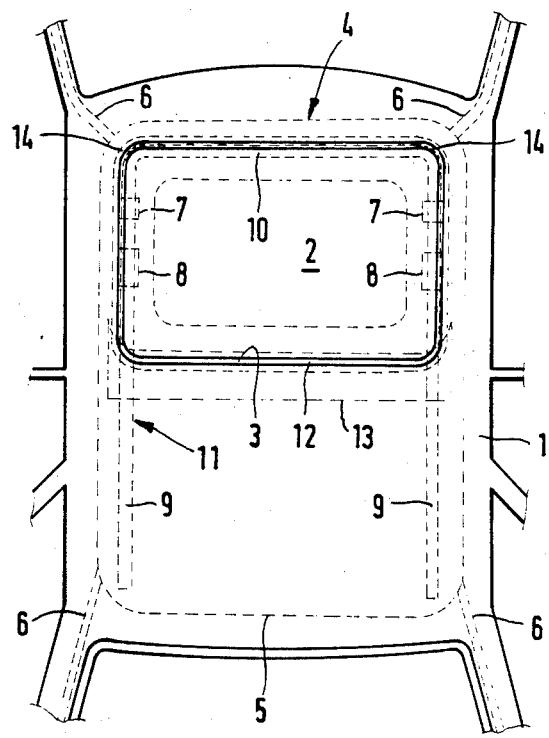
FIG. 1 is a partial plan view of an automobile sliding roof with the sliding panel closed.

From the schematic illustration of an automobile roof according to FIG. 1, a fixed vehicle roof 1 can be seen, in the forward region of which a roof opening 3, closable by a sliding panel 2, is provided. Beneath the fixed vehicle roof 1 a sliding roof frame 4, surrounding the roof opening 3, is fixed, which constitutes in its rear region, i.e. underneath the rear, fixed roof surface, a water collecting pan 5 of large area. Water outlets 6 are connected to the sliding roof frame 4 or its water collecting pin. The sliding panel 2 is guided, in a manner to be explained later, by forward guide shoes 7 and rear guide shoes 8 at the lateral guide components 9 of a single-piece guide frame, consisting of these lateral guide components 9 and of a forward guide component 10, this guide frame being generally referenced 11. Also apparent from FIG. 1 is a water guide plate 13, disposed above the guide frame 11 and extending beneath the rear edge gap 12. The lateral guide components 9 extend parallel to each other and are connected by rounded corners 14 with the forward guide component 10 to form the one-piece U-shaped guide frame 11.

For explaining the first embodiment of the cable guide, reference is made below to FIGS. 2 to 5. As can be seen therefrom, all three guide components of the guide frame 11 have an identical profiling throughout. In the example shown, the guide frame 11 is manufactured from an extruded profile of a malleable aluminium alloy, bent at the two corners 14. The guide frame profile possesses basically an upwardly open U-shaped cross-section, which is constituted essentially of two thickened side walls 15 and 16 and a web 17, connecting the two side walls together. The side walls 15, 16 and the web 17 bound an upwardly open profile cavity 18.

Figure 3:
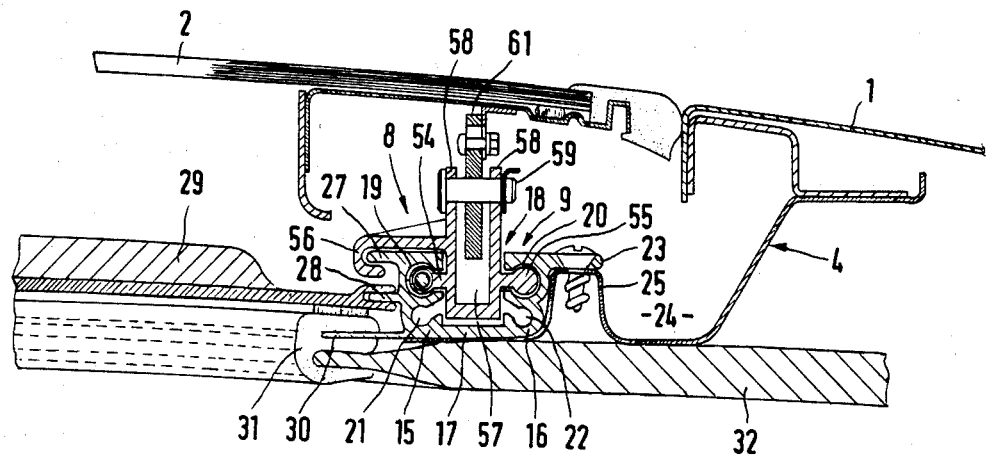
FIG. 3 is a partial sectional view through a rear guide shoe taken along the line III—III in FIG. 2.

As can be best seen from FIG. 3, two opposite facing upper cable guide channels 19, 20 and two opposite facing lower guide channels 21, 22 for the guide shoes are provided in the side walls 15, 16.

The guide frame profile also possesses an outwardly projecting fixing flange 23, by which it is fixed with screws 26 to a rib 25 of the sliding roof frame 4 bounding the water channel 24 (FIG. 3). Adjoining the inner side wall 15 of the guide frame profile and lying in the same plane as the fixing flange 23, is an inwardly projecting guide flange 27, which guides the guide shoes 7, 8 in a manner yet to be described.

Also situated on the inner side wall 15 are a central, inwardly projecting flange 28 for the sliding guidance of a panel lining 29 and a lower, also inwardly projecting flange 30, for the push-on fixing of a clamping profile 31 for retaining the roof lining 32.

Figure 7:
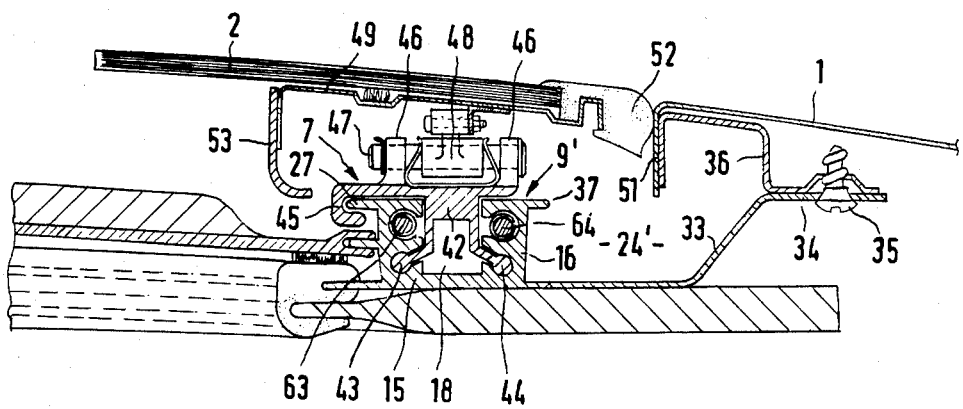
FIG. 7 is a partial sectional view through the guide frame in the region of the forward guide shoe along line VII—VII in FIG. 6
Figure 8:
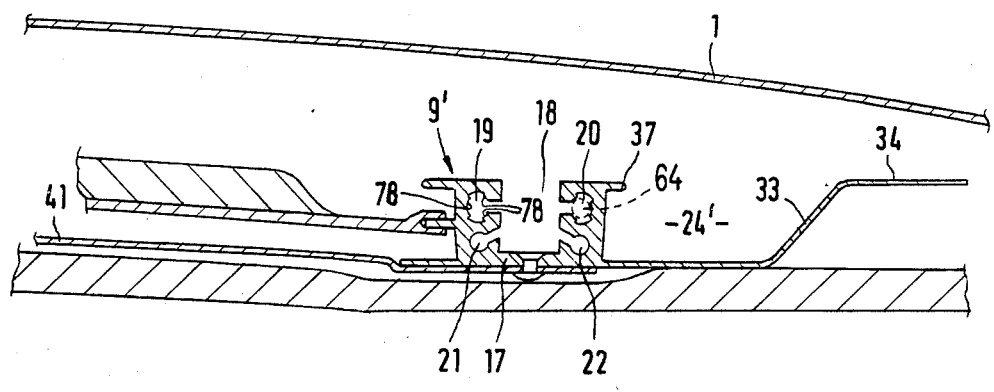
FIG. 8 is a partial sectional view taken along line VIII—VIII in FIG. 6.

For describing the second example of embodiment of the cable guide, reference is now made to FIGS. 6 to 8. As can be seen therefrom, the profile of the guide frame 11' is once again identical at the lateral guide components 9' and the forward guide component 10', and possesses, with the exceptions yet to be described, a cross-sectional form which substantially is the same as that already described. The outer, thickened side wall 16, however, is here adjoined by an edge flange 33, integrally formed with the profile and projecting outwards, which together with this side wall 16 bounds the water channel 24'. The edge flange 33 climbs upwardly and outwardly and terminates in a fixing flange 34, by means of which the guide frame 11' is attached by screws 35 to an intermediate frame 36, fixed to the fixed vehicle roof 1 (FIG. 7).

In the embodiment according to FIGS. 6 to 8, the provision of a fixing flange 23 (FIG. 3) is unnecessary, because its function is taken over by the fixing flange 34. It may nevertheless be appropriate to provide, on the outer side wall 16, an upper projection 37, which counteracts escape of water out of the water channel 24' into the profile cavity 18 or even into the interior of the vehicle.

In this embodiment of the invention also, the guide frame profile may be a profile extruded from a malleable aluminium alloy. To facilitate the bending operation at the corners 14' of this relatively broad profile, the edge flange 33 constituting the water channel 24' and, of course, also the fixing flange 34, are cut out along line 38. After the frame profile has been bent, the cut-outs are closed in watertight manner by attaching plastic inserts 39. In this embodiment, the forward water outlets 6 are connected to the plastics inserts 39, whereas the rear water outlets 6 are each attached to a closure wall 40, fitted in watertight manner to the lateral guide components 9'. In this embodiment, no water collecting pan 5 (FIG. 1) is provided. The water penetrating through the rear edge gap 12 is conducted away by the water guide plate 13 directly into the water channel 24', by locating the discharge ends of the water guide plate 13 above the water channel 24'.

For stiffening the guide frame, a transverse connector 41, bridging across the two lateral guide components 9', is provided, which is riveted to the lower faces of the lateral guide components 9', as shown in FIGS. 6 and 8. A corresponding transverse connector may also be provided in the embodiment according to FIGS. 2 to 5.

For explaining the guiding situation at the forward guide shoes 7, which is the same for both embodiments, reference is now made to FIGS. 4 and 7, from which the right-hand, forward shoe 7 is apparent. The left-hand guide shoe is the same but to opposite hand. The guide shoe 7 extends, with a downwardly oriented, strip-like projection 42, into the profile cavity 18 and slidably engages the guide channels 21, 22 respectively of the lateral guide components 9 in the longitudinal direction of the profile by downwardly and outwardly cranked slide projections 43, 44, integrally formed on the strip-like projection 42. In addition, a hook-like projection 45 of the guide shoe 7 engages the guide flange 27 of the guide component 9, by which assurance is provided that the guide shoe 7 cannot lift off the guide component 9, even under the action of considerable forces.

The guide shoe 7 is equipped at the front with a bearing fork 46, which is traversed by a pivot pin 47. The pivot pin constitutes the forward pivot bearing of the sliding panel 2. A rearwardly oriented connecting lever 48 is articulated to the pivot pin 47, and the free end of this lever is connected firmly, but adjustable in height, with a lug 50 fixed to a stiffening member 49 of the sliding panel.

In the embodiment illustrated, the sliding panel 2 is a transparent acrylic glass panel adhesively, fixed to the sliding panel stiffener 49. The edge gap sealing at a vertical downward flange 51 of the fixed vehicle roof 1 is provided by an edge gap seal 52, fitted to the sliding panel 2 and the stiffener 49. The sliding panel stiffener 49 is adjoined by a downwardly oriented shutter strip 53, which covers the functional components mounted on the guide frame 11, 11' respectively on the inside towards the roof opening.

For describing the guide situation at the rear guide shoes 8, reference is now made to FIGS. 3 and 4, which show the left, rear guide shoe 8. The right, rear guide shoe is the same but to opposite hand. The guide shoe 8 slidably engages the profile cavity 18 to the vicinity of the web 17, and is slidably guided in the cable guide channels 19, 20 respectively by slide projections 54, 55, fixed on its opposite sides. In addition, a hook-like projection 56 mounted on the guide shoe 8 engages the guide flange 27 of the guide frame profile, thus providing additional insurance against lifting of the guide shoe off the lateral guide component 9. Further slide projections could, of course, also be provided on the rear guide shoe similar to the slide projections 43, 44 of the forward guide shoe. Such an additional guiding of the rear guide shoe is, however, in general not necessary. Due to the back-cut form of the guide channels 21, 22 and the cable guide channels 19, 20, the forward and rear guide shoes 7, 8 have to be pushed from the rear onto the initially free ends of the two lateral guide components 9, 9' respectively.

As FIG. 3 shows, in conjunction with FIGS. 2 and 6 respectively, the rear guide shoe 8 possesses a slit-shaped depression 57, continuous over its length, which is bounded in the upper part by two lateral walls 58, arranged in fork-like manner. A lifting pin 59 passes through the side walls 58, and engages the link slit 60 of a link plate 61 which penetrates into the slit-shaped depression 57. The link plate 61 is fixed in height-adjustable manner to fixing lugs 62 of the sliding panel stiffener 49.

In each of the cable guide channels 19, 20 there is a cable 63, 64 respectively, for carrying out the adjustment movements of the sliding panel 2. The cables 63, 64 are each force-transmittingly connected to one of the slide projections 54, 55 of the rear guide shoes 8, as illustrated in FIGS. 2, 4 and 6 by appropriate cut-away views. By means of the cables 63 and 64, the two rear guide shoes 8 can be synchronously displaced in the same direction in the manner usual in sliding roof constructions of this type. As FIG. 4 shows, during the displacement of the rear guide shoes 8 which serves for the raising and lowering pivoting movement of the sliding panel 2, the lifting pin 59 moves in the link slit 60, causing the sliding panel 2 to be pivoted upwards or downwards about the pivot pins 47 depending upon the direction of displacement. The rearwardly and upwardly oriented continuation 65 of the link slit 60 serves, in conjunction with the lifting pin 59, for the lowering of the rear edge of the sliding panel 2 when the latter is to be displaced beneath the rear, fixed roof surface 1, and for raising the rear edge of the sliding panel 2, when it is to be returned out of its displaced open position into its closed position.

As can be seen also from FIG. 4, the water guide plate 13 is connected by a link 66 with the link plate 61. A corresponding arrangement is found also on the opposite side of the guide frame. The water guide plate 13 has lateral sliders 67 extending into the profile cavity and is slidably guided in one of the cable guide channels 19, 20.

The position of the drive components, again similar in principle in both embodiments, can be seen from FIG. 5. The gear drive mechanism 68 extends through an opening, not referenced, in the sliding roof frame 4 and is fixed to this frame. If no sliding roof frame is present, but the water channel 24' is itself a component of the guide frame, then the drive mechanism 68 is fixed directly to the forward guide component 10' of the guide frame. The drive mechanism 68 extends upwards with a sleeve 70 surrounding the drive shaft 69 into a cylindrical opening 71 formed in the forward guide component 10 of the guide frame 11, to fit tightly into this opening. The cylindrical opening 71 continues through the depth of the guide component 10 and extends also through the web 17. A toothed pinion 72 is fixed to the drive shaft 69 and engages the thread turns of the two cables 63 and 64 in the known manner of a rack and pinion drive, so that rotations of the pinion 72 produce simultaneous displacements of the cables 63, 64 in the cable guide channels 29, 20. The rotational actuation of the pinion 72 is effected via the drive apparatus 68 by means of a hand crank 73. Instead of a hand crank, an electric motor drive can, of course, be provided. FIGS. 2 and 6 indicate an orientation of the hand crank 73 displaced through 180° relative to that of the crank 73 in FIG. 5.

As already described, the profile cavity 18 and the functional components are so dimensioned and mutually arranged that these functional components are at least partially housed in the profile cavity. In relation to the forward and rear guide shoes 7, 8 respectively, it has been described how important parts of the guide shoes and of the elements connected therewith penetrate into the profile cavity, thus achieving a compact construction. The profile cavity 18 can, however, also be utilized for the purpose of completely housing raising arms 74 of a wind deflector 75, illustrated only in FIGS. 2 and 6, in the at-rest position of the wind deflector 75. The wind deflector 75 is hinged at 76 and 77 to the sliding roof frame (embodiment according to FIG. 2) or to the forward guide component 10' of the guide frame 11 (embodiment according to FIG. 6). The raising arms 74 are each, as indicated in FIGS. 2 and 6, articulated at one end to the wind deflector 75 and pivotally journalled at the other end on a pivot pin in the profile cavity 18 oriented transversely to the associated lateral guide component 9, 9' respectively.

The cable guide channels 19, 20 can, as illustrated in FIG. 8, be so constructed that only partial regions of the channel wall are used for guiding the cables. In the example shown, there are only three partial regions 78 in each guide channel, which are distributed around the circular periphery of the channel cross-section. Thus the friction of the cables 63, 64 in the cable guide channels 19, 20 can be appreciably reduced.

The cable guide according to this invention offers, compared to all known multi-part cable guides, the advantage that all the desired dimensions of the cable guides, such as are necessary for different sizes of roof opening, can be easily manufactured using the same tools from continuous profile material.

We claim:

1. A cable guide frame structure for an automobile sliding roof panel comprising:
   (a) a single piece guide frame formed in a generally U-shaped configuration having lateral guide components connected by a forward guide component, the guide frame having a pair of opposed side walls joined at one end by a web to form an upwardly open U-shaped cross-section defining a cavity, each of the side walls defining an upper cable and guide shoe channel and a lower guide shoe channel extending throughout the length of the frame; and, (b) a plurality of guide shoes attached to a sliding roof panel, each of the guide shoes being slidably retained in the guide channels.

2. A cable guide frame structure according to claim 1 wherein the guide frame is formed of metal which is bent at the two corners to form the U-shaped configuration.

3. A cable guide frame structure according to claim 2, wherein the metal guide frame is an extrusion of malleable aluminum alloy.

4. A cable guide frame structure according to claim 2, wherein the metal guide frame is shaped from sheet metal.

5. A cable guide frame structure according to claim 1, wherein the guide frame is formed from a thermoplastics material, which is bent at the two corners to form the U-shaped configuration.

6. A cable guide frame structure according to claim 1 wherein the guide frame has integrally formed thereon an outwardly projecting fixing flange from an outer side wall of its cross-section.

7. A cable guide frame structure according to claim 6 wherein the guide frame has integrally formed thereon an inwardly projecting guide flange projecting from a top portion of an inner side wall.

8. A cable guide frame structure according to claim 7 wherein the guide frame has integrally formed thereon second inwardly projecting flanges projecting from the inner side wall of its cross-section, for guiding a sliding panel lining and for attaching a roof lining respectively.

9. A cable guide frame structure according to claim 1 wherein the guide frame has an outwardly projecting edge flange projecting from a bottom portion of an outer side wall of its cross-section to define a water channel thereabove and a fixing flange integrally formed on an outer portion of the edge flange.

10. A cable guide frame structure according to claim 9, wherein the edge flange is cut away to facilitate bending and further comprising plastic inserts attached to the guide frame in the cut away portions after bending.

11. A cable guide frame structure according to claim 1 further comprising a transverse connector interconnecting the lateral guide components.

12. A cable guide frame structure according to claim 9 further comprising a water guide plate, connected with the rear guide shoes and extending beneath a rear edge gap between the sliding panel and an automobile roof, the discharge ends of which terminate above the water channel and means to displaceably guide the water guide plate.

13. A cable guide frame structure according to claim 1 wherein the forward guide component of the guide frame defines an opening extending through the web wall situated between the side walls and extending into the cavity for the passage of a drive shaft of a toothed pinion in engagement with drive cables.

14. A cable guide frame structure according to claim 1 wherein the cross-section of the cable and guide shoe channels is such that only partial regions of the channels contact the guide cables.

15. The cable guide frame structure according to claim 1 wherein a pair of forward guide shoes are slidably retained in the lower guide shoe channels of the lateral guide components.

16. The cable guide frame structure according to claim 15 wherein a pair of rear guide shoes are slidably retained in the upper cable and guide shoe channels of the lateral guide components.

17. The cable guide frame structure according to claim 7 wherein each guide shoe has a hook-shaped projection which slidably engages the inwardly projecting guide flange.

* * * * *